P. H. GRIMM.
STEAM TRAP AND SYSTEM FOR DRAINING WATER OF CONDENSATION FROM STEAM COILS.
APPLICATION FILED NOV. 25, 1912.
1,078,783.
Patented Nov. 18, 1913.
2 SHEETS—SHEET 1.
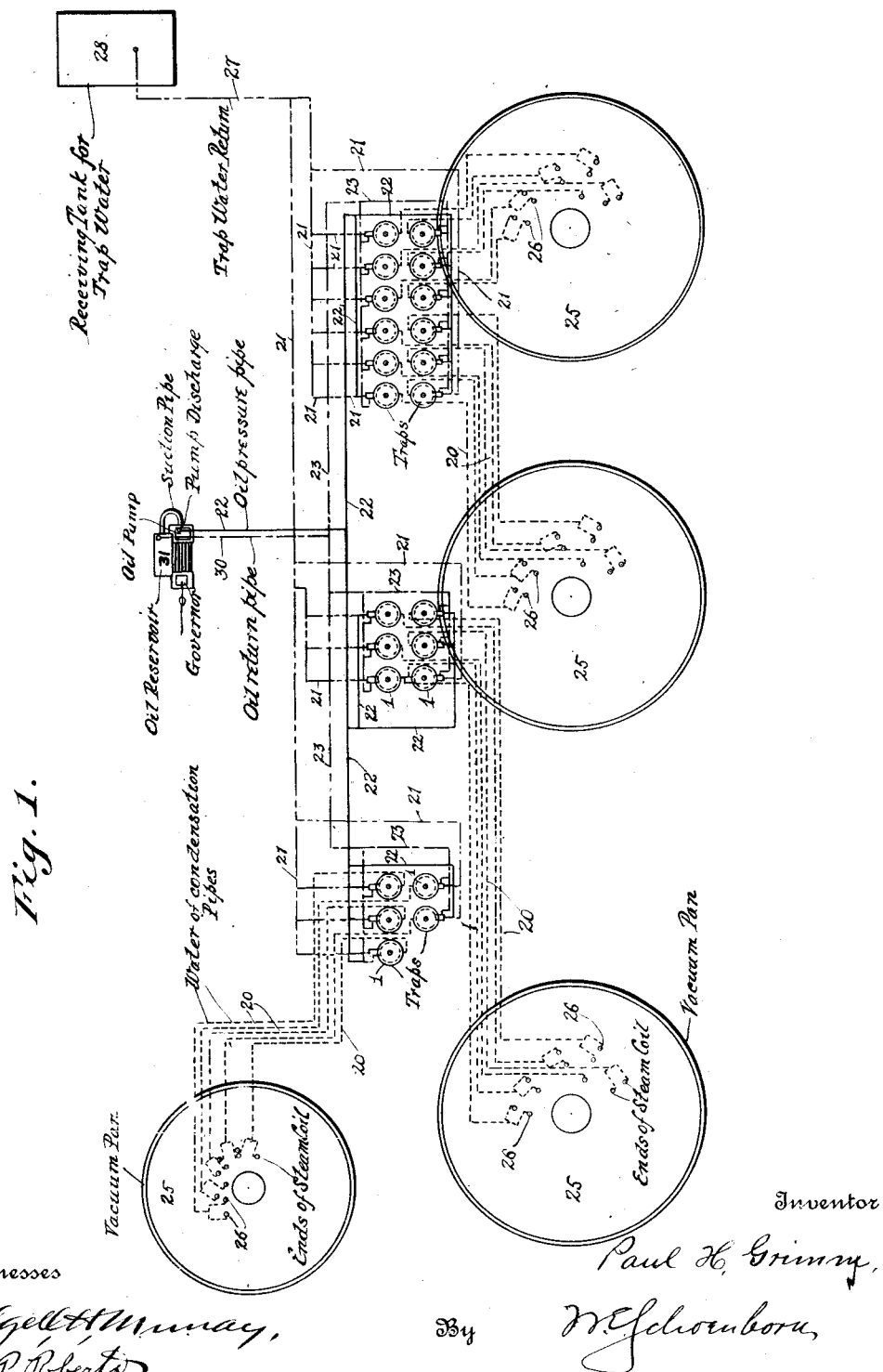

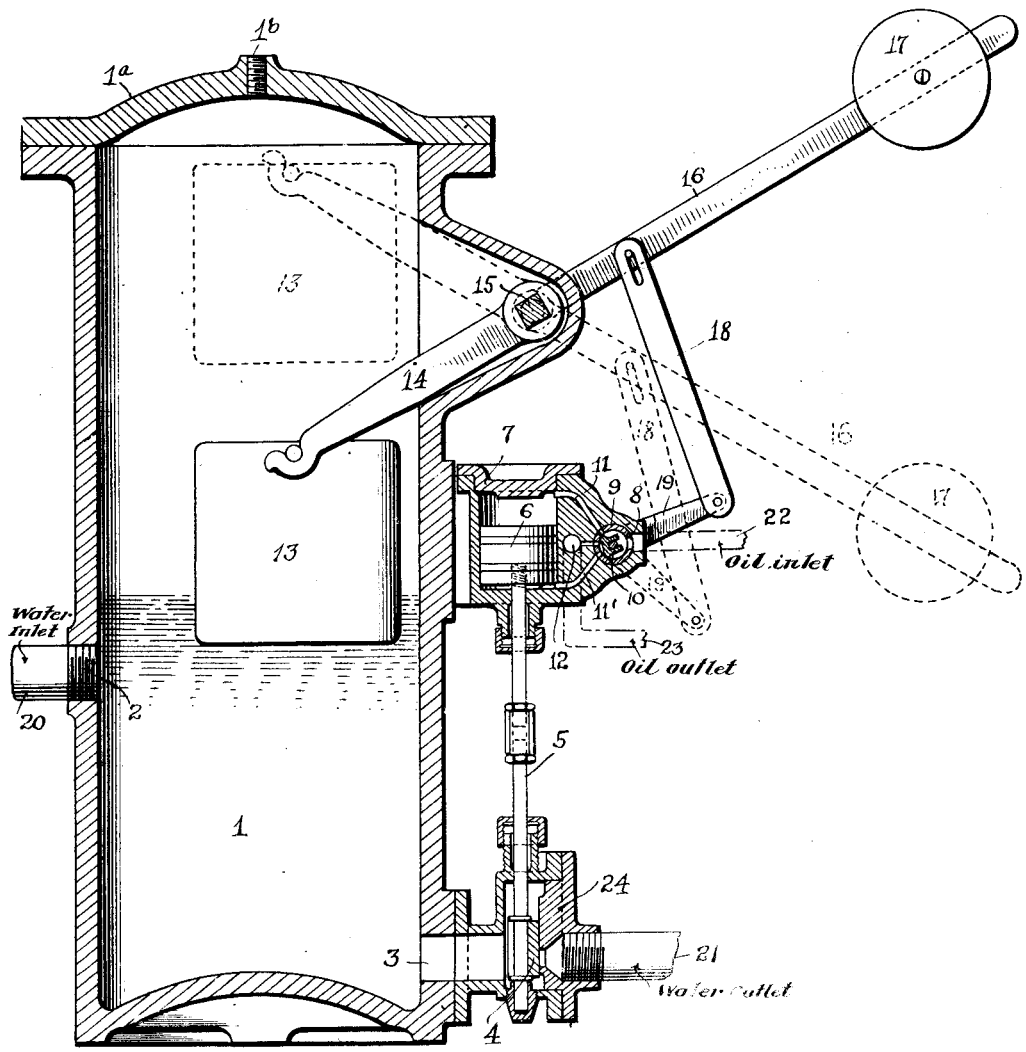

UNITED STATES PATENT OFFICE.

PAUL H. GRIMM, OF GLEN COVE, NEW YORK.

STEAM-TRAP AND SYSTEM FOR DRAINING WATER OF CONDENSATION FROM STEAM-COILS.

1,078,783.      Specification of Letters Patent.    Patented Nov. 18, 1913.

Application filed November 25, 1912. Serial No. 733,561.

*To all whom it may concern:*

Be it known that I, PAUL H. GRIMM, a citizen of the United States, residing at Glen Cove, in the county of Nassau and State of New York, have invented certain new and useful Improvements in Steam-Traps and Systems for Draining Water of Condensation from Steam-Coils, of which the following is a specification.

My invention relates to improvements in steam traps and a system of installing the same for the removal of water of condensation from the steam coils of vacuum pans or other similar devices, where the positive and intermittent withdrawal of accumulated water is required after the heat has been extricated from a body of steam, and at the same time insure no escape of the confined steam during such operations.

The object of my invention is to construct a steam trap in which the operating piston, cylinder, and its connected parts for controlling the outlet for the water of condensation, can be easily inspected and repaired without disturbing the other elements of the trap and at the same time the motive fluid for the operation of the trap acts as a lubricant and is used over again in the closed system. Furthermore, the outlet valve of the trap is so arranged that the internal pressure of the steam, and water of condensation as it accumulates forces said outlet valve against its seat and insures no leakage or passage of water through the outlet pipe until the required time and hence assures no waste of steam.

A further object of the invention is to arrange the traps with their inlets and outlets and motive fluid connections for operating the outlet valves, so that the entire system is a closed one, in which the motive fluid or oil for operating the outlet valves, and the water of condensation is used over and over again, and the motive fluid is automatically controlled at a predetermined pressure sufficient to give the proper working to the operating piston on each trap.

The invention consists of structural features and relative arrangements of the various elements which will be hereinafter more fully described and particularly pointed out in the appended claims.

In the accompanying sheets of drawing, in which similar reference characters indicate the same parts in the several figure. Figure 1 is a diagrammatic view showing an arrangement or system of connecting a series of traps according to my invention; and Fig. 2 is a vertical section of the trap used in the system indicated in Fig. 1.

Referring to Fig. 2, the numeral 1 represents the steam tight receptacle which is provided with a flanged cover $1^a$ having a vent $1^b$ for non-condensable gases, a water of condensation inlet 2, and outlet 3, said inlet being above the outlet as shown. 4 is a slide valve controlling the outlet 3 and is connected by means of an adjustable rod 5, passing through suitable stuffing boxes, to a piston 6 within a motor cylinder 7, removably attached to the side of the casing 1. A motive fluid inlet 8 connects with a chest 9, in which is provided an oscillating valve 10 controlling the ports 11, 11′ and exhaust port 12. A float 13 is provided on the inside of the casing 1 which is carried by an arm 14 connected to a rocker shaft 15, supported in and extending through the casing, the outer end of said shaft 15 having an arm 16 rigidly connected thereto and carrying an adjustable counterweight 17, as shown. 18 is a link connecting the arm 16 to arm 19 attached to the oscillating slide valve 10, for the purpose of conveying the motion of the float to the said valve 10. Connected with the receptacle inlet 2 is a pipe 20 which leads the water of condensation to the interior of the receptacle 1. The numeral 21 represents a drain pipe connected to outlet 3 beyond the controlling valve 4 for the purpose of conveying the water of condensation to a common reservoir. To the motive fluid inlet 8 is attached a pipe 22 and to the exhaust 12, a pipe 23 is connected for the purposes to be hereinafter more fully described with relation to the system of traps shown in Fig. 1.

The operation of the trap is as follows:

Assuming the different parts of the [trap] [are in] the positions shown in Fig. 2 and the [water] of condensation passing through the [pipe] 20 and the receptacle 2. After an [accumu-]
lation of said water reaches such a level as to lift the float 13 to the upper end of the casing, the float 13, arms 14 and 16 and weight 17, will assume the positions shown in dotted lines, the oscillating valve 10 will
be in such a relation as [shown in?] communicating the lever port 11' with the source of motive fluid and raise the piston 6 with its connected valve 4, and open communication between the interior of the casing 1
and the drain pipe 21, and permit the water to pass out. After the water level has been lowered, so that the float 13 and valve 10 again assume the positions shown in full lines, the motive fluid pressure passing into
upper port 11, forces down the piston and causes the fluid or oil under the piston 6 to pass through the port 11', exhaust port 12, and pipe 23, to a tank common to all the traps, where it is again capable of being
put under pressure by a pump, as will be presently described.

It will be seen from the foregoing disclosure that when the valve 4 closes, the receptacle is still nearly half full of water
which acts as a water seal and does not permit the steam to come in contact with the outlet valve 4. Furthermore, by the above construction and operation, when the valve 4 is actuated it is opened full and
quickly, thus permitting the water to pass out in the shortest possible time and when the slide valve 4 closes, it is held to its seat by the pressure within and water in the trap, and insures a perfectly tight fit and
prevents all leakage of steam and water. Said valve 4 also wears itself to its seat 24, and hence insures no leaking, and should at any time the seat 24 or valve 4 need inspection, said seat can be removed without
disturbing the valve, or adjustments. Another advantage of my form of trap is, by having the motive fluid for operating the motor cylinder and outlet valve 4 separate and independent of the trap and pressure
within the same, said discharge of the water condensation is always assured when the water level reaches a predetermined point in the trap, whether the pressure in the trap is high or low, and insufficient to operate
the piston 6, and also, by having the motor cylinder 7 and piston 6 on the outside of the trap it can be readily inspected without disturbing the operation of the trap or taking the same apart.

Steam traps in ordinary use are provided with balanced outlet valves for the reason that they can be easily moved by the available pressure within the trap, which as a rule is of very low pressure and hence liable
[to derangement?] found, in the mechanism on [...] operating the out[let valve?] [...] except by taking [...] whether the trap is in [...] with a trap constructed [according to the present?] invention a test can be [...] made to determine [...] after [...] in operation by simply [...] rod up or down, and if the trap is in proper condition the rod will [...] working up or down. The [...] of the present invention is also constructed as [to be?] independent of friction as there is ample power independent of the trap to operate it and it is also impossible to clog said valve or outlet by sediment, as it never leaves its seat and is self cleaning. The piston 6 within the motor cylinder 7 is made proof against sticking as the oil under pressure fully lubricates all parts, and the fluid being operated in a closed circuit prevents any impurities from mixing with it. As it will be seen that this pressure fluid is worked over and over again there is no waste, and certainty of operation is assured. Furthermore it will also be seen, by the employment of a pump with a governor for controlling the working fluid pressure for operating the motors, said fluid pressure can be varied to suit any conditions to which the device may be employed.

In Fig. 1 will be found illustrated an example of my system for drainage of steam coils, and in this particular instance the invention is applied to vacuum pans used in sugar refining, in which 25, 25 represent a series of vacuum pans. 26, 26 are the terminals of a series of pipes receiving the water of condensation from the steam coils within the vacuum pans. The terminals 26, 26 are connected by the series of pipes 20, 20, indicated by dotted lines, which lead to the different inlets 2 (see Fig. 2) of the different trap receptacles 1, 1, each trap being preferably only connected with one of the coils in the vacuum pans. The water outlet 3 of each trap is connected by a separate pipe 21, indicated by lines composed of two dots and a dash, to a common trap water return pipe 27 which leads to receiving tank 28. The numeral 29 is an oil pump which is provided with a common form of governor to control the pressure of discharge into the oil delivery pipes 22, 22, indicated in solid lines, having branches and leading to the different valve chests 9, of the series of traps 1. The return oil pipes 23, 23, indicated by line composed of dots and dashes, lead from the exhaust of the motor cylinders 7 of the different traps, 1, to a common oil return pipe 30 leading to a reservoir 31 connected with the suction end of the oil pump 29.

The operation of the arrangement or system of traps and connections illustrated in Fig. 1 is as follows:—Whenever the condensation in any one of the steam coils in the vacuum pans 25 is such that the water passing from its terminals 26 by way of its own pipe 20 to the interior of its particular trap 1, is sufficient to raise the float 13, in such a position as to actuate its outlet slide valve 4 in the manner already described, the water of condensation of that particular trap passes by its own pipe connection 21 to a common return pipe 27 and thence to the receiving tank 28, from which it is pumped by any suitable means to a boiler to be converted into steam and again supplied to the coils of the vacuum pans.

During the foregoing operation the oil under pressure in the pipe 22 which actuated the outlet slide valve 4 of the particular trap 1 just referred to is on return of the float 13 to its normal position, exhausted by the operation of the oscillating valve 10 into its particular oil return pipe 23, thence into pipe 30 leading to a reservoir 31, from whence it is taken up by the pump 29 with any suitable governor, and again forced under controlled and regulated pressure into any one of the pipes 22, to be again used to actuate any one of the outlet valves 4 of the series of traps 1.

From the foregoing disclosure of my arrangement of traps with their connections and pump, it will be seen that the operation of each trap is independent of any other and that the oil and water in the system are all inclosed, and no losses are effected through heat, evaporation, or any other causes, the many motor cylinder valves are automatically lubricated, and no leakage of steam or water is permitted through the water outlet valves.

What I claim:—

1. A steam trap comprising a receptacle having an inlet and an outlet, a valve controlling said outlet, a float in said receptacle, a motor cylinder exterior of said receptacle and receiving motive fluid independently of said trap, a valve for said motor cylinder, a piston in said cylinder, an exterior rod connecting said piston with the outlet valve, and a lever exterior of said receptacle connected with said float and valve for the motor cylinder for controlling said motive fluid into said cylinder and operation of the outlet valve.

2. A steam trap comprising a receptacle having an inlet and an outlet, a slide valve controlling said outlet and forced against its seat by the pressure and fluid within the receptacle, a float in said receptacle, a motor cylinder exterior of said receptacle and receiving and exhausting motive fluid independently of said trap, a valve for said motor cylinder, a piston in said cylinder, a rod exterior of said receptacle connecting said slide valve with the piston, and a lever exterior of the receptacle connected with said float and valve for the motor cylinder for controlling the inlet and exhaust of the motive fluid into the motor cylinder and operation of the outlet valve.

3. A steam trap comprising a receptacle having an inlet and an outlet, a vertical slide valve controlling said outlet and forced against its seat by the pressure and fluid within the receptacle, a float in said receptacle, a motor cylinder exterior of and independent of said receptacle and having combined motive and lubricating fluid inlet and outlet, a valve for said motor cylinder, a piston in said cylinder, a rod exterior of said receptacle connecting said slide valve with the piston, and a lever exterior of the receptacle connected with said float and valve for the motor cylinder for controlling the inlet and exhaust of the motive fluid into the motor cylinder and operation of the outlet valve.

4. A system for the automatic draining of water of condensation from a series of heating coils comprising a series of traps, each of said traps having a water inlet and outlet and a valve controlling said outlet, a motor cylinder for each trap for actuating the outlet valve and having a fluid pressure inlet and exhaust independent of the trap and pressure within the same, a series of pipes each of which forms a connection between the outlet of a heating coil and the inlet of the trap for said coil, a series of drain pipes so distributed that the outlet of each of the traps is connected with a receiving or storage tank by one of said drain pipes, a source of combined motive and lubricating fluid supply, a fluid pressure pump having its inlet connected with said fluid supply, a series of fluid pressure pipes so arranged that the inlet of each of the motor cylinders is connected by one of said pipes with the exhaust of the pressure pump, and a series of pipes so disposed as to connect the exhaust of each of the motor cylinders with the source of motive fluid supply.

5. A system for the automatic draining of water of condensation from a series of heating coils comprising a storage tank, a series of traps, each of said traps having a water inlet and outlet and a valve controlling said outlet, a motor cylinder for each trap for actuating the outlet valve and having a fluid pressure inlet and exhaust independent of the trap and pressure within the same, a series of pipes each of which forms a connection between the outlet of a heating coil and the inlet of the trap for said coil, a series of drain pipes so distributed that the outlet of each of the traps is connected with a storage tank by one of said drain pipes, a source of combined motive and lubricating fluid supply, a fluid pressure pump having its inlet connected with said fluid supply, a series of fluid pressure pipes so arranged that the inlet of each of the motor cylinders is connected by one of said pipes with the exhaust of the pressure pump, and a series of pipes so disposed as to connect the exhaust of each of the motor cylinders with the source of the motive fluid.

In testimony whereof I affix my signature in presence of two witnesses.

PAUL H. GRIMM.

Witnesses:
C. H. EASTMENT,
SAMUEL GOLDBERG.